(12) United States Patent
Suganuma

(10) Patent No.: US 8,641,258 B2
(45) Date of Patent: Feb. 4, 2014

(54) LIGHT GUIDE PANEL AND OPTICAL SYSTEM INCLUDING THE SAME

(71) Applicant: Enplas Corporation, Kawaguchi (JP)

(72) Inventor: Takayoshi Suganuma, Kawaguchi (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 13/665,301

(22) Filed: Oct. 31, 2012

(65) Prior Publication Data

US 2013/0107569 A1  May 2, 2013

(30) Foreign Application Priority Data

Nov. 2, 2011 (JP) ................................. 2011-241472

(51) Int. Cl.
*F21V 8/00* (2006.01)

(52) U.S. Cl.
USPC ............................ 362/616; 362/628; 362/617

(58) Field of Classification Search
USPC ................................................ 362/609–629
See application file for complete search history.

(56) References Cited

U.S. PATENT DOCUMENTS

| | | | |
|---|---|---|---|
| 5,703,667 A | 12/1997 | Ochiai | |
| 6,036,340 A * | 3/2000 | Fohl et al. | 362/619 |
| 6,196,691 B1 * | 3/2001 | Ochiai | 362/617 |
| 2005/0201120 A1 * | 9/2005 | Nesterenko et al. | 362/609 |
| 2008/0297696 A1 * | 12/2008 | Banerjee | 349/65 |
| 2009/0190373 A1 * | 7/2009 | Bita et al. | 362/620 |
| 2010/0302803 A1 * | 12/2010 | Bita et al. | 362/606 |
| 2011/0043142 A1 * | 2/2011 | Travis et al. | 362/617 |

FOREIGN PATENT DOCUMENTS

| | | |
|---|---|---|
| JP | H07-248496 A | 9/1995 |
| JP | H09-325218 A | 12/1997 |

\* cited by examiner

*Primary Examiner* — Mariceli Santiago
(74) *Attorney, Agent, or Firm* — Law Office of Katsuhiro Arai

(57) ABSTRACT

A light guide panel 1 having a reflective sub-wavelength diffraction grating 3 generates zero-order light and minus first-order light in the reflective sub-wavelength diffraction grating 3, extracts the minus first-order light as outgoing light, and transmits the zero-order light to generate new minus first-order light by satisfying the conditional expressions:

$$\sin^{-1}(1/n) < \theta_1 \quad (1)$$

$$\lambda/\{n(\sin\theta_1+1)\} \leq \Lambda < \min[2\lambda/\{n(\sin\theta_1+1)\}, \lambda/\{n(-\sin\theta_1+1)\}] \quad (2)$$

$$\sin^{-1}\{\sin\theta_1 - \lambda/(n\cdot\Lambda)\} < \sin^{-1}(1/n) \quad (3)$$

where,
$\lambda$: wavelength of light
$n$: refractive index of a light guide panel main body
$\Lambda$: period of the reflective sub-wavelength diffraction grating
$\theta_1$: angle of incidence of the light in relation to the reflective sub-wavelength diffraction grating.

13 Claims, 6 Drawing Sheets

LIGHT GUIDE PANEL AND OPTICAL SYSTEM INCLUDING THE SAME

TECHNICAL FIELD

The present invention relates to a light guide panel and an optical system including the light guide panel. In particular, the present invention relates to a light guide panel suitable for use in a surface light source and an optical system including the light guide panel.

BACKGROUND ART

Since the past, a surface light source apparatus including a light guide panel has been used for purposes such as a backlight in liquid crystal display devices, internal illumination signboards, and lighting systems.

As a light guide panel used in this type of surface light source apparatus, in general, a light guide panel has been conventionally used that extracts light from a light source (such as a laser light source) towards the front surface side of the light guide panel using refraction or total reflection phenomenon attributed to the surface shape of the light guide panel having a grooved structure, a conical structure, a columnar structure, or the like.

On the other hand, a light guide panel using a diffraction grating has been proposed in recent years as a new type of light guide panel (refer to Patent Literature 1 and Patent Literature 2). This type of light guide panel has an advantage in that a surface light source having higher and more uniform luminance than that of the past can be actualized by transmission of light generated by diffraction by the diffraction grating.

Patent Literature 1: Japanese Patent Laid-open Publication No. Heisei 9-325218
Patent Literature 2: Japanese Patent Laid-open Publication No. Heisei 7-248496

DISCLOSURE OF INVENTION

Problem to be Solved by the Invention

However, in the conventional light guide panel using a diffraction grating, light of multiple orders of diffraction unique to the diffraction grating, such as plus/minus second-order light, is generated in addition to plus/minus first-order light, in relation to the light incident on the diffraction grating. Therefore, a problem occurs in that light having various angle components is generated, tending to cause stray light. Use of a diffraction grating such as this that generates light of multiple orders of diffraction is advantageous in terms of achieving uniform luminance in the surface light source. On the other hand, light is dispersed at different angles depending on the order of diffraction, and total reflection of light and the like may also occur, resulting in an increase in components that become stray light. Therefore, generating light of multiple orders of diffraction is not necessarily advantageous in terms of light use efficiency.

In this respect, light use efficiency can be improved by determining the optimal shape of the diffraction grating using Monte Carlo ray tracing methods and optimization algorithms. However, in this instance, because numerous light rays are required to be traced, calculation often becomes extremely heavy in terms of computing capability. In addition, a problem occurs in that, although luminance calculation of a given structure can be performed, optimization calculation is often difficult.

The present invention has been achieved in light of the above-described issues. An object of the present invention is to provide a light guide panel capable of easily actualizing a surface light source having excellent light use efficiency with little light loss due to stray light, and an optical system using the light guide panel.

Means for Solving Problem

To achieve the above-described object, a light guide panel according to a first aspect of the present invention includes a plate-shaped, light-transmissive light guide panel main body having predetermined width, depth, and thickness. The light guide panel main body has a first surface on which coherent light is incident, a second surface disposed adjacent to the first surface in a width direction and perpendicular to a thickness direction in which outgoing light based on the coherent light incident on the first surface is extracted, and a third surface disposed parallel with the second surface in a position facing the second surface in the thickness direction. A reflective sub-wavelength diffraction grating is provided on the third surface, the reflective sub-wavelength diffraction grating being composed of a fine periodic structure in which a plurality of projecting sections, formed integrally with the light guide panel main body and elongated in the depth direction, are disposed along the width direction in an array at an interval smaller than the wavelength of the coherent light, and a reflective film covering the fine periodic structure. Only zero-order light and minus first-order light are generated by incidence of the coherent light onto the reflective sub-wavelength diffraction grating, the generated zero-order light entering the second surface at an angle of incidence greater than a critical angle, being totally reflected, and then incident on the reflective sub-wavelength diffraction grating, while on the other hand, the generated minus first-order light enters the second surface at an angle of incidence smaller than the critical angle and is emitted from the second surface, and subsequently, generation of only new zero-order light and minus first-order light as a result of incidence of the zero-order light onto the reflective sub-wavelength diffraction grating, incidence of the generated new zero-order light onto the reflective sub-wavelength diffraction grating after total reflection by the second surface, and emission of the generated new minus first-order light from the second surface are repeated a plurality of times, as a result of each conditional expression expressed by the following expressions (1) to (3) being satisfied:

$$\sin^{-1}(1/n) < \theta_1 \tag{1}$$

$$\lambda/\{n(\sin\theta_1+1)\} \leq \Lambda < \min[2\lambda/\{n(\sin\theta_1+1)\}, \lambda/\{n(-\sin\theta_1+1)\}] \tag{2}$$

$$\sin^{-1}\{\sin\theta_1 - \lambda/(n\cdot\Lambda)\} < \sin^{-1}(1/n) \tag{3}$$

where,
λ: wavelength of the light
n: refractive index of the light guide panel main body
Λ: period of the reflective sub-wavelength diffraction grating
$\theta_1$: angle of incidence of the light in relation to the reflective sub-wavelength diffraction grating In the invention according to the first aspect, as a result of conditional expressions (1) to (3) being satisfied, the minus first-order light generated based on the incident light onto the reflective sub-wavelength diffraction grating can be emitted from the second surface to form a surface light source. In addition, the zero-order light generated based on the incident light onto the reflective sub-wavelength diffraction grating can be transmitted to a next position of incidence onto the reflective sub-wavelength diffraction grating using total reflection at the second surface to generate new minus first-order light. Furthermore, generation of light other than the zero-order light and the minus first-order light based on the incident light onto the reflective sub-wavelength diffraction grating can be prevented. As a result, a surface light source having excellent light use efficiency with little light loss due to stray light can be easily actualized without requiring complicated designs, such as ray tracing.

In addition, a light guide panel according to a second aspect is the light guide panel according to the first aspect, in which, further, the reflective sub-wavelength diffraction grating is formed such that the height of the projecting sections and diffraction efficiency of the minus first-order light corresponding to the height increase towards a downstream side of a transmission direction of the zero-order light in the width direction such that intensity of the minus first-order light emitted from the second surface is uniform regardless of position of emission.

In the invention according to the second aspect, the intensity of the minus first-order light emitted from the second surface can be made uniform regardless of the position of emission. Therefore, uniformity of luminance of the surface light source can be improved.

Furthermore, a light guide panel according to a third aspect is the light guide panel according to the second aspect in which, further, the height of the projecting sections is set such that the intensity of the last new zero-order light generated by the last incidence of zero-order light onto the reflective sub-wavelength diffraction grating is a predetermined value or less.

In the invention according to the third aspect, most of the light incident on the reflective sub-wavelength diffraction grating can be converted to the minus first-order light, or in other words, the surface light source. Therefore, light use efficiency can be improved.

Furthermore, a light guide panel according to a fourth aspect is the light guide panel according to the second or third aspect in which, further, the height of the projecting sections is determined by: calculating the number of occurrences of diffraction based on the coherent light in the reflective sub-wavelength diffraction grating, based on $\theta_1$, the thickness of the light guide panel main body, and the dimension in the width direction of the reflective sub-wavelength diffraction grating; calculating a constant intensity of the minus first-order light to be achieved per occurrence of diffraction in the reflective sub-wavelength diffraction grating, based on the calculated number of occurrences and the intensity of the coherent light; calculating the diffraction efficiency of the minus first-order light per occurrence of diffraction allowing the calculated constant intensity to be achieved, based on the intensity of the coherent light, the constant intensity, and total reduction amount of light intensity caused by diffraction up to the preceding occurrence; and back-calculating the height of the projecting sections corresponding to the calculated diffraction efficiency of the minus first-order light per occurrence of diffraction, based on simulation results of diffraction efficiency of the minus first-order light in which the height of the projecting section is a variable.

In the invention according to the fourth aspect, the height of each projecting section allowing the intensity of the minus first-order light to be made uniform can be easily determined. Therefore, uniformity of luminance of the surface light source can be improved with certainty.

Furthermore, a light guide panel according to a fifth aspect is the light guide panel according to any one of the first to fourth aspects in which the first surface is formed into a slope having a slope angle $\theta_1$ in relation to the third surface such that the coherent light is perpendicularly incident, and a conditional expression expressed by the following expression (4) is satisfied:

$$t \leq W/(2 \cdot \sin \theta_1) \qquad (4)$$

where,
t: thickness of the light guide panel main body
W: light beam width in the direction perpendicular to the depth direction of the coherent light perpendicularly incident on first surface.

In the invention according to the fifth aspect, as a result of conditional expression (4) being satisfied, incidence of light onto the reflective sub-wavelength diffraction grating and the accompanying generation of the minus first-order light can be evenly performed in the width direction by a simple structure. In accompaniment, emission of the minus first-order light from the second surface can be evenly performed in the width direction. Therefore, uniformity of luminance of the surface light source can be further improved.

Furthermore, a light guide panel according to a sixth aspect is the light guide panel according to any one of the first to fifth aspects in which, further, the first surface is composed of a slope of a prism that is continuous with an end section on an upstream side of the transmission direction of the zero-order light in the width direction of the second surface.

In the invention according to the sixth aspect, the first surface is disposed in a position away from the second surface so as not to be positioned on the optical paths of the zero-order light and the minus first-order light generated by the reflective sub-wavelength diffraction grating. In addition, the light incident on the first surface can be made to enter the reflective sub-wavelength diffraction grating immediately after advancing straight through the light guide panel main body. Therefore, the surface light source can be actualized with certainty, and the size in the width direction of the light guide panel can be reduced.

Furthermore, a light guide panel according to a seventh aspect is the light guide panel according to any one of the first to sixth aspects in which, further, the first surface is formed into a rectangular shape that is elongated along the depth direction, and the coherent light has a rectangular shape that is elongated along the first surface on the first surface.

In the invention according to the seventh aspect, uniformity of luminance of the surface light source in the depth direction can be further improved.

Furthermore, a light guide panel according to an eighth aspect is the light guide panel according to any one of the first to seventh aspects further including a prism sheet disposed facing the second surface, the prism sheet correcting a traveling direction of the minus first-order light towards a direction perpendicular to the second surface by refracting the minus first-order light emitted from the second surface.

In the invention according to the eighth aspect, as a result of correction of the traveling direction of the minus first-order light by the prism sheet, a surface light source in which the light is emitted directly above the light guide panel main body and that is suitable for purposes such as a backlight of a liquid crystal display device can be actualized.

Furthermore, a light guide panel according to a ninth aspect is the light guide panel according to the eighth aspect in which, further, the prism sheet has a plurality of prisms having an isosceles triangle shape that sharpens towards the second surface side in an arbitrary cross-section perpendicular to the depth direction, each prism being disposed such that a bisecting line bisecting the vertex in a cross-section is perpendicular to the second surface, and a conditional expression expressed by the following expression (5) is satisfied:

$$\cos\{\sigma/2+\sin^{-1}(n\cdot\sin\theta_1-\lambda/\Lambda)\}=N\cdot\cos(3\sigma/2) \quad (5)$$

where,

σ: vertex angle of the prism of the prism sheet

N: refractive index of the prism of the prism sheet

In the invention according to the ninth aspect, as a result of conditional expression (5) being satisfied, optimal correction of the travelling direction of the minus first-order light by the prism sheet can be easily performed.

Furthermore, an optical system according to a tenth aspect includes the light guide panel according to the eighth or ninth aspect, and a light emitting device that emits the coherent light towards the first surface of the light guide panel.

In the invention according to the tenth aspect, a surface light source having excellent light use efficiency can be actualized.

Furthermore, an optical system according to an eleventh aspect is the optical system according to the tenth aspect in which, further, the first surface is formed into the elongated rectangular shape according to the seventh aspect, and the light emitting device includes a light source that emits the coherent light, and an optical element that shapes the coherent light emitted from the light source into light having the elongated rectangular shape according to the seventh aspect.

In the invention according to the eleventh aspect, uniformity of luminance of the surface light source can be improved.

Effect of the Invention

In the present invention, a surface light source having excellent light use efficiency with little light loss due to stray light can be easily actualized.

| EXPLANATIONS OF LETTERS OR NUMERALS | |
|---|---|
| 1 | light guide panel |
| 2 | light guide panel main body |
| 3 | reflective sub-wavelength diffraction grating |
| 22 | projecting section |
| 31 | fine periodic structure |
| 32 | reflective film |

BEST MODE(S) FOR CARRYING OUT THE INVENTION (Light Guide Panel According to First Embodiment)

A light guide panel according to a first embodiment of the present invention will hereinafter be described with reference to FIG. 1 and FIG. 2.

Figure 1:
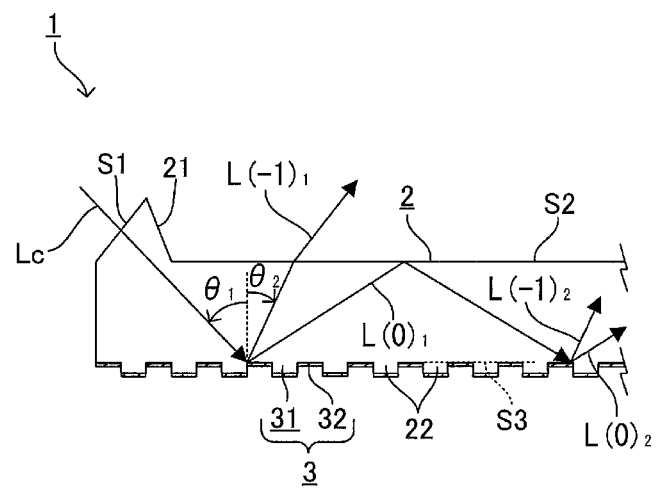
FIG. 1 shows a configuration diagram of a light guide panel according to a first embodiment of the present invention.
Figure 2:
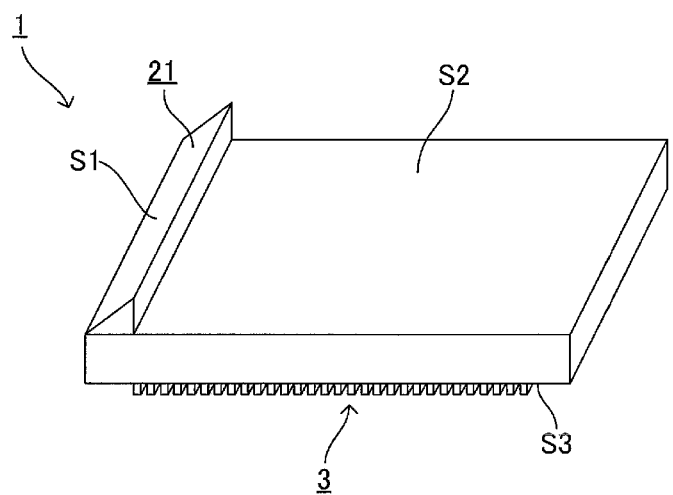
FIG. 2 shows a perspective view of FIG. 1.

As shown in FIG. 1, a light guide panel 1 according to the first embodiment has a plate-shaped, light-transmissive light guide panel main body 2 having predetermined width, depth, and thickness. The light guide panel main body 2 may be formed by an optical resin material, such as a cyclo-olefin polymer resin.

As shown in FIG. 1, the light guide panel main body 2 has a first surface S1, a second surface S2 (front surface), and a third surface S3 (back surface). Coherent light Lc (only a single light ray among a light beam is shown as a representative) is incident on the first surface S1. The second surface S2 is disposed adjacent to the first surface S1 in a width direction (lateral direction in FIG. 1), and is perpendicular to a thickness direction (vertical direction in FIG. 1) in which outgoing light based on the coherent light Lc incident on the first surface S1 is extracted. The third surface S3 is disposed parallel with the second surface S2 in a position facing the second surface S2 in the thickness direction.

Specific configurations of the first surface S1, the second surface S2, and the third surface S3 are as follows. As shown in FIG. 1, the first surface S1 is formed having a slope angle that is greater than the critical angle of the light guide panel main body 2 in relation to the third surface S3, such that the coherent light Lc perpendicularly incident on the first surface S1 enters at an angle of incidence that is greater than the critical angle of the third surface S3. More specifically, as shown in FIG. 1 and FIG. 2, the first surface S1 is composed of a slope (left slope in FIG. 1) of a triangular prism-shaped prism 21 that is continuous with one end (left end in FIG. 1) of the second surface S2 and is elongated in a depth direction (direction perpendicular to the paper on which the drawing is printed in FIG. 1).

As shown in FIG. 1, the second surface S2 is formed into a planar surface and is rectangular from a planar view.

Furthermore, as shown in FIG. 1, the third surface S3 is a planar surface that is parallel with the second surface S2. A reflective sub-wavelength diffraction grating 3 is formed on the third surface S3. As shown in FIG. 1, the reflective sub-wavelength diffraction grating 3 has a fine periodic structure 32 in which a plurality of projecting sections 22 are disposed along the width direction in an array at an interval smaller than the wavelength of the coherent light Lc. The plurality of projecting sections 22 are formed integrally with (from the same material as) the light guide panel main body 2 and are elongated in the depth direction. In addition, as shown in FIG. 1, the reflective sub-wavelength diffraction grating 3 has a thin reflective film 32 covering the fine periodic structure 32. In FIG. 1, the reflective film 32 covers the third surface S3 between the projecting sections 22 and the top portions of the projecting sections 22. The projecting sections 22 in FIG. 1 are ordinary rectangular-shaped projections referred to as a binary type (level 2). However, the projecting sections 22 may be multi-level projections. In addition, the reflective film 32 may be a coating of a metal thin film having favorable light reflectance, such as aluminum Al, silver, Ag, or gold Au. Furthermore, a suitable value (such as 200 nm) may be selected as the thickness of the reflective film 32, depending on the concept.

The light guide panel 1 according to the first embodiment satisfies the following conditional expressions (1) to (3).

$$\sin^{-1}(1/n) < \theta_1 \quad (1)$$

$$\lambda/\{n(\sin\theta_1+1)\} \leq \Lambda < \min[2\lambda/\{n(\sin\theta_1+1)\}, \lambda/\{n(-\sin\theta_1+1)\}] \quad (2)$$

$$\sin^{-1}\{\sin\theta_1 - \lambda/(n\cdot\Lambda)\} < \sin^{-1}(1/n) \quad (3)$$

$\lambda$ in expressions (2) and (3) represents the wavelength [nm] of the coherent light Lc (the same applies hereafter). n in expressions (1) to (3) represents the refractive index of the light guide panel main body 2 corresponding to $\lambda$ (the same applies hereafter). $\Lambda$ in expressions (2) and (3) represents the period [nm] of the reflective sub-wavelength diffraction grating 3 and can be considered to be the same as the period of the fine period structure 31 (the same applies hereafter). $\theta_1$ in expressions (1) to (3) represents the angle of incidence [°] of the coherent light Lc in relation to the reflective sub-wavelength diffraction grating 3 (the same applies hereafter). min in expression (2) is a symbol representing the parameter having the smallest value among a plurality of parameters (two, in this instance) within the parentheses following the symbol (the same applies hereafter).

<<Definition of Expression (1)>>

Here, expression (1) expresses a condition under which the coherent light Lc incident on the first surface S1 enters the reflective sub-wavelength diffraction grating 3 (or in other words, the third surface S3 or the reflective film 32) at an angle of incidence $\theta_1$ that is greater than the critical angle.

In other words, when the condition expressed by expression (1) is not satisfied, the coherent light Lc enters the reflective sub-wavelength diffraction grating 3 at an angle of incidence $\theta_1$ that is smaller than the critical angle. In this instance, zero-order light that is generated with minus first-order light by the incidence of the coherent light Lc onto the reflective sub-wavelength diffraction grating 3 enters the second surface S2 at the angle of incidence $\theta_1$ that is smaller than the critical angle. Therefore, the zero-order light escapes outside of the light guide panel 1 without being totally reflected at the second surface S2. As a result, the zero-order light cannot be transmitted to a position of incidence (diffraction position) onto the reflective sub-wavelength diffraction grating 3 to generate new minus first-order light.

Therefore, when expression (1) is satisfied, total reflection of the zero-order light at the second surface S2 can be ensured, and the zero-order light can be transmitted to the next position of incidence onto the reflective sub-wavelength diffraction grating 3 to generate the new minus first-order light and new zero-order light required to generate subsequent minus first-order light. As a result, the area over which the minus first-order light and the zero-order light are generated can be widened in the width direction. Therefore, expression (1) also expresses a condition for continuous generation of zero-order light.

<<Definition of Expression (2)>>

In addition, expression (2) expresses a condition under which, as a result of diffraction phenomenon caused by the incidence of the coherent light Lc or the zero-order light onto the reflective sub-wavelength diffraction grating 3, only minus first-order light $L(-1)_i$ is generated as substantial diffraction light other than zero-order light $L(0)_i$, as shown in FIG. 1. The zero-order light $L(0)_i$ is inevitably generated as long as incidence of light onto the reflective sub-wavelength diffraction grating 3 is performed. Here, i in the numbering of the diffraction light is a natural number representing the diffraction phenomenon, in terms of the number of occurrences, in the reflective sub-wavelength diffraction grating 3 in which the corresponding diffraction light has been generated. The maximum value of i is the total number of occurrences of the diffraction phenomenon in the reflective sub-wavelength diffraction grating 3. For example, as shown in FIG. 1, the first occurrence of the diffraction phenomenon, as well as the first zero-order light $L(0)_1$ and minus first-order light $L(-1)_1$ based on the first occurrence, are generated by the incidence of the coherent light Lc onto the reflective sub-wavelength diffraction grating 3. In addition, the second occurrence of the diffraction phenomenon, as well as the second zero-order light $L(0)_2$ and minus first-order light $L(-1)_2$ based on the second occurrence, are generated by the incidence of the first zero-order light $L(0)_1$ onto the reflective sub-wavelength diffraction grating 3.

When the condition expressed by expression (2) is not satisfied, plus first-order light and high-order light that is plus/minus second order or higher are generated in addition to the minus first-order light $L(-1)_i$ as the diffraction light.

Expression (2), as described above, can be derived in the following manner.

<Condition Under which Minus First-Order Light is Generated>

First, in addition to $\lambda$, $\Lambda$, n, and $\theta_1$ (where $0° < \theta_1 < 90°$ is presumed; the same applies hereafter), when the order of diffraction of diffraction light is m and the diffraction angle [°] of the diffraction light is $\theta_2$ (a positive value in FIG. 1, for convenience, but may be a negative value), a general diffraction grating equation is as follows:

$$n \cdot \sin\theta_2 = n \cdot \sin\theta_1 + m(\lambda/\Lambda) \quad (6)$$

As a result of substituting −1 for m in expression (6), a diffraction grating equation specific to the minus first-order light is as follows:

$$n \cdot \sin\theta_2 = n \cdot \sin\Lambda_1 - \lambda/\Lambda \quad (7)$$

When equation (7) is transformed, $\sin\theta_2 = \sin\theta_1 - \lambda/(n \cdot \Lambda)$ is obtained. Furthermore, because $|\sin\theta_2| \leq 1$, the following expression can be obtained:

$$-1 \leq \sin\theta_1 - \lambda/(n \cdot \Lambda) \leq 1 \quad (8)$$

Expression (8) can be divided into two expressions, $-1 \leq \sin\theta_1 - \lambda/(n \cdot \Lambda)$ and $\sin\theta_1 - \lambda/(n \cdot \Lambda) \leq 1$. When the former of the two expressions is transformed, $\Lambda \leq \lambda/\{n(\sin\theta_1+1)\}$ is obtained. On the other hand, when the latter of the two expressions is transformed, first, $\lambda/(n \cdot \Lambda)\sin\theta_1 - 1$ is obtained, and then $\lambda/n \geq \Lambda(\sin\theta_1 - 1)$. Subsequently, taking into consideration that the value of the right side $(\sin\theta_1 - 1)$ is negative, $\Lambda \geq \lambda/\{n(\sin\theta_1-1)\}$ is obtained. However, because $\sin\theta_1 - 1$ is negative at all times and A is positive at all times, the latter expression $\Lambda \geq \lambda/\{n(\sin\theta_1-1)\}$ is a so-called absolute inequality that is established at all times. Thus, the latter expression does not give substantial limitations to A. Therefore, a substantial condition under which the minus first-order light is generated is the former equation or, to reiterate, as follows:

$$\Lambda \geq \lambda/\{n(\sin\theta_1+1)\} \quad (9)$$

<Condition Under which Plus First-Order Light is not Generated>

Next, as a result of substituting +1 form in expression (6), a diffraction grating equation specific to plus first-order light is as follows:

$$n \cdot \sin\theta_2 = n \cdot \sin\theta_1 + \lambda/\Lambda \quad (10)$$

Taking into consideration $|\sin\theta_2| \leq 1$, expression (10) can be transformed as follows:

$$-1 \leq \sin\theta_1 + \lambda/(n \cdot \Lambda) \leq 1 \quad (11)$$

Expression (11) can be divided into two expressions, $-1 \leq \sin\theta_1 + \lambda/(n \cdot \Lambda)$ and $\sin\theta_1 + \lambda/(n \cdot \Lambda) \leq 1$. When the former of the two expressions is transformed, first, $\lambda/n \geq \Lambda(-\sin\theta_1 - 1)$ is obtained. Then, taking into consideration that the value of the right side $(-\sin\theta_1 - 1)$ is negative, $\Lambda \geq \lambda/\{n(-\sin\theta_1 - 1)\}$ is obtained. However, because $-\sin\theta_1 - 1$ is negative at all times and $\Lambda$ is positive at all times, the inequality is a so-called absolute inequality that is established at all times. Thus, the former expression does not give substantial limitations to $\Lambda$. On the other hand, when the latter of the two expressions is transformed, the following expression is obtained as a condition under which the plus first-order light is generated:

$$\Lambda \geq \lambda/\{n(-\sin\theta_1 + 1)\} \quad (12)$$

The condition under which the plus first-order light is not generated is the following expression that does not satisfy expression (12):

$$\Lambda < \lambda/\{n(-\sin\theta_1 + 1)\} \quad (13)$$

<Condition Under which Diffraction Light of a Negative Order of Diffraction that is Minus Second Order or Higher is not Generated>

Next, when a negative order of diffraction that is minus second order or higher (meaning, herein, higher as a negative value) is $-M$ (where M is a positive integer of 2 or higher; the same applies hereafter), a condition under which minus M-order light is generated can be expressed by the following expression by multiplying the right side of expression (9), which is the condition under which the minus first-order light is generated, by M:

$$\Lambda \geq M\lambda/\{n(\sin\theta_1 + 1)\} \quad (14)$$

The condition under which diffraction light of a negative order of diffraction that is minus second order or higher (in other words, minus M-order light) is not generated is the following expression that does not satisfy expression (14):

$$\Lambda < M\lambda/\{n(\sin\theta_1 + 1)\} \quad (15)$$

<Condition Under which Diffraction Light of a Positive Order of Diffraction that is Plus Second Order or Higher is not Generated>

Next, when a positive order of diffraction that is plus second order or higher is $+M$, a condition under which plus M-order light is not generated can be expressed by the following expression by multiplying the right side of expression (13), which is the condition under which the plus first-order light is not generated, by M:

$$\Lambda < M\lambda/\{n(-\sin\theta_1 + 1)\} \quad (16)$$

<Condition Under which Only Minus First-Order Light is Generated as Substantial Diffraction Light Other than Zero-Order Light>

A condition under which only minus first-order light is generated as substantial diffraction light other than the zero-order light (or in other words, a condition under which the minus first-order light is generated, and the plus first-order light and high-order light that is plus/minus second order or higher are not generated) is a compound condition composed of expression (9), expression (13), expression (15), and expression (16). The compound condition can first be determined as the following expression:

$$\lambda/\{n(\sin\theta_1+1)\} \leq \Lambda < \min[M\lambda/\{n(\sin\theta_1+1)\}, M\lambda/\{n(-\sin\theta_1+1)\}, \lambda/\{n(-\sin\theta_1+1)\}] \quad (2)'$$

Taking into consideration $0° < \theta_1° < 90°$, the magnitude correlation between $M\lambda/\{n(\sin\theta_1+1)\}$ and $M\lambda/\{n(-\sin\theta_1+1)\}$ in expression (2)' is clear. The former is smaller. In addition, the magnitude correlation between $M\lambda/\{n(-\sin\theta_1+1)\}$ and $\lambda/\{n(-\sin\theta_1+1)\}$ in expression (2)' is also clear. The latter is smaller. Therefore, $M\lambda/\{n(-\sin\theta_1+1)\}$ is not selected as the minimum value (min) on the right side of expression (2)'. Therefore, expression (2)' can be rearranged to obtain the following expression.

$$\lambda/\{n(\sin\theta_1+1)\} \leq \Lambda < \min[M\lambda/\{n(\sin\theta_1+1)\}, \lambda/\{n(-\sin\theta_1+1)\}] \quad (2)''$$

In expression (2)", the minimum value of $M\lambda/\{n(\sin\theta_1+1)\}$ is clearly that when $M=2$. Therefore, expression (2)" can be rearranged to obtain the following expression:

$$\lambda/\{n(\sin\theta_1+1)\} \leq \Lambda < \min[2\lambda/\{n(\sin\theta_1+1)\}, \lambda/\{n(-\sin\theta_1+1)\}] \quad (2)$$

Expression (2) can be derived in this way.

<<Definition of Expression (3)>>

Furthermore, expression (3) expresses a condition under which the minus first-order light generated by the diffraction phenomenon occurring in the reflective sub-wavelength diffraction grating 3 is emitted outside from the second surface S2.

Expression (3) can be derived in the following manner.

In other words, first, the diffraction angle $\theta_2$ of the minus first-order light becomes the value of the following expression as a result of expression (7) being transformed.

$$\theta_2 = \sin^{-1}\{\sin\theta_1 - \lambda/(n \cdot \Lambda)\} \quad (17)$$

To enable the minus first-order light to be emitted from the second surface S2, the minus first-order light is required not to be totally reflected at the second surface S2, or in other words, the angle of incidence of the minus first-order light in relation to the second surface S2 is required to be smaller than the critical angle. When the angle of incidence of the minus first-order light in relation to the second surface S2 is $\theta in$, the above can be expressed by the following expression:

$$\theta in < \sin^{-1}(1/n) \quad (3)'$$

Taking into consideration that the base line (line at 0°) of the diffraction angle $\theta_2$ of the minus first-order light is parallel with the base line (line at 0°) of the angle of incidence $\theta_{in}$ of the minus first-order light as result of the second surface S2 being parallel with the third surface S3, the $\theta_2$ and the $\theta_{in}$ are equal angles because their relationship is that of alternate angles formed by a slope line (equivalent to the light ray of the minus first-order light) intersecting two parallel lines (base line of an angle).

Therefore, as a result of substituting $\theta_2$ for $\theta in$ in expression (3)', the following expression can be obtained:

$$\sin^{-1}\{\sin\theta_1 - \lambda/(n \cdot \Lambda)\} < \sin^{-1}(1/n) \quad (3)$$

Expression (3) can be derived in this way.

(Effects According to the First Embodiment)

According to the first embodiment, the coherent light Lc that is perpendicularly incident on the first surface S1 advances straight through the interior of the light guide panel main body 2 and subsequently enters the reflective sub-wavelength diffraction grating 3 at the angle of incidence $\theta_1$. As a result, the first occurrence of the diffraction phenomenon occurs in the reflective sub-wavelength diffraction grating 3. At this time, as a result of expression (2) being satisfied, only the first minus first-order light $L(-1)_1$ is generated as a substantial diffraction light other than the first zero-order light $L(0)_1$. The first zero-order light $L(0)_1$ is the coherent light Lc that has been incident on the reflective sub-wavelength diffraction grating 3 and then reflected at a reflection angle $-\theta_1$ with reduced light intensity, and is not substantially light generated by diffraction. The first zero-order light $L(0)_1$ advances through the interior of the light guide panel main body 2 towards the second surface S2 side in the direction of the reflection angle $-\theta_1$. The first minus first-order light $L(-1)_1$ advances through the interior of the light guide panel main body 2 towards the second surface S2 side in the direction of the diffraction angle $\theta_2$, or in other words, $\sin^{-1}\{\sin\theta_1 - \lambda/(n\cdot\Lambda)\}$.

Next, the first zero-order light $L(0)_1$ enters the second surface S2 at the angle of incidence $\theta_1$. This is obvious based on the base line (line at 0°) of the angle of incidence defined at the reflective sub-wavelength diffraction grating 3 and the base line (line at 0°) of the angle of incidence defined at the second surface S2 being parallel with each other as a result of the second surface S2 and the third surface S3 (or the reflective film 32) being parallel with each other. At this time, as a result of expression (1) being satisfied, the first zero-order light $L(0)_1$ is totally reflected at the second surface S2. The totally reflected first zero-order light $L(0)_1$ advances through the interior of the light guide panel main body 2 towards the reflective sub-wavelength diffraction grating 3 side in the direction of the total reflection angle $-\theta_1$. On the other hand, the first minus first-order light $L(-1)_1$ enters the second surface S2 at an angle of incidence $\theta_2$. At this time, as a result of the expression (3) being satisfied, the first minus first-order light $L(-1)_1$ is emitted outside (upwards in FIG. 1) from the second surface S2 in the direction of the refraction angle $\sin^{-1}(n\cdot\sin\theta_1 - \lambda/\Lambda)$, based on Snell's law.

Next, the first zero-order light $L(0)_1$ that has been totally reflected at the second surface S2 enters the reflective sub-wavelength diffraction grating 3 at the angle of incidence $\theta_1$. As a result, the second occurrence of the diffraction phenomenon occurs in the reflective sub-wavelength diffraction grating 3. At this time, as a result of expression (2) being satisfied, only the second minus first-order light $L(-1)_2$ is generated as a substantial diffraction light other than the second zero-order light $L(0)_2$. The second zero-order light $L(0)_2$ is the first zero-order light $L(0)_1$ that has been incident on the reflective sub-wavelength diffraction grating 3 and then reflected at the reflection angle $-\theta_1$ with reduced light intensity, and is not substantially light generated by diffraction. The second zero-order light $L(0)_2$ advances through the interior of the light guide panel main body 2 towards the second surface S2 side in the direction of the reflection angle $-\theta_1$. The second minus first-order light $L(-1)_2$ advances through the interior of the light guide panel main body 2 towards the second surface S2 in the direction of the diffraction angle $\theta_2$.

Next, the second zero-order light $L(0)_2$ enters the second surface S2 at the angle of incidence $\theta_1$. At this time, as a result of expression (1) being satisfied, the second zero-order light $L(0)_2$ is totally reflected at the second surface S2. Then, the totally reflected second zero-order light $L(0)_2$ advances through the interior of the light guide panel main body 2 towards the reflective sub-wavelength diffraction grating 3 side in the direction of the total reflection angle $-\theta_1$. On the other hand, the second minus first-order light $L(-1)_2$ enters the second surface S2 at the angle of incidence $\theta_2$. At this time, as a result of expression (3) being satisfied, the second minus first-order light $L(-1)_2$ is emitted outside from the second surface S2 in the direction of the refraction angle $\sin^{-1}(n\cdot\sin\theta_1 - \lambda/\Lambda)$, based on Snell's law.

In this way, generation of new zero-order light $L(0)_{k+1}$ and minus first-order light $L(-1)_{k+1}$ as a result of incidence of the zero-order light $L(0)_k$ onto the reflective sub-wavelength diffraction grating 3, incidence of the new zero-order light $L(0)_{k+1}$ onto the reflective sub-wavelength diffraction grating 3 after total reflection by the second surface S2, and emission of the new first-order light $L(-1)_{k+1}$ from the second surface S2 are repeated. The number of repetitions depends on the angle of incidence $\theta_1$, the thickness of the light guide panel main body 2, and the dimension in the width direction of the reflective sub-wavelength diffraction grating 3. Details will be described hereafter in the descriptions of a second embodiment and a fourth example.

In the light guide panel 1 according to the first embodiment as described above, a surface light source having excellent light use efficiency with little light loss due to stray light can be easily actualized without requiring complicated designs, such as ray tracing and optimization algorithms.

More preferably, the coherent light Lc incident on the first surface S1 is a rectangular light having a rectangular shape that is elongated in the depth direction on the first surface S1, such as to adhere to the first surface S1 having a rectangular shape that is elongated along the depth direction.

As a result of a configuration such as this, uniformity of luminance in the depth direction of the surface light source can be further improved.

(Light Guide Panel According to Second Embodiment)

Next, a light guide panel according to a second embodiment will be described with reference to FIG. 3, mainly focusing on differences from that according to the first embodiment. For convenience, sections of which the basic configuration is the same or similar to that according to the first embodiment are described using the same reference numbers.

Figure 3:
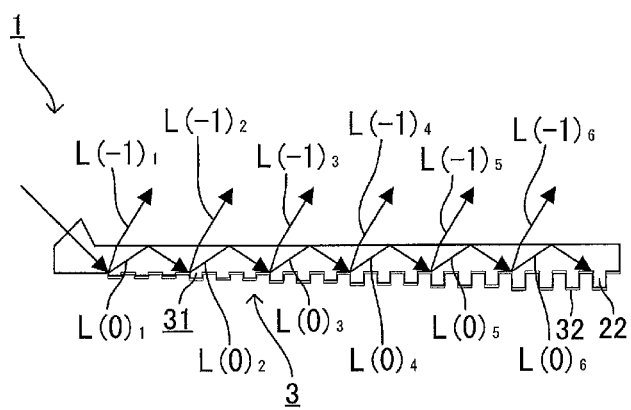
FIG. 3 shows a configuration diagram of a light guide panel according to a second embodiment of the present invention.

In the light guide panel 1 according to the second embodiment, in addition to the configuration according to the first embodiment, the projecting sections 22 of the reflective sub-wavelength diffraction grating 3 (fine periodic structure 31) are formed such as to increase in height towards the downstream side of the transmission direction of the zero-order light $L(0)_i$ in the width direction, as shown in FIG. 3. The purpose of this configuration is to increase diffraction efficiency of the minus first-order light $L(-1)_i$, based on the height of the projecting sections 22, towards the downstream side such that the intensity of the minus first-order light $L(-1)_i$ emitted from the second surface S2 is uniform regardless of the position of emission (in other words, i). The intensity of light in the present invention may be expressed, for example, by the unit [W/cm$^3$] or may be light quantity [lm·s].

Here, the diffraction efficiency of the minus first-order light $L(-1)_i$ in the reflective sub-wavelength diffraction grating 2 can be determined by simulation using vector diffraction theory, such as the rigorous coupled-wave analysis (RCWA) method (refer to Journal of the Optical Society of America 71, 811-818, 1981; Journal of the Optical Society of America 73, 451-455, 1983; and Journal of the Optical Society of America 73, 1105-1112, 1983), the modal method, or the T-matrix method. The diffraction efficiency tends to increase with the increase in height of the projecting sections 22, within a predetermined height range of the projecting sections 22, as described hereafter.

The height of each projecting section 22 for the purpose of achieving uniformity in the intensity of the minus first-order light $L(-1)_i$, as described above, can be set, for example, by a following method.

In other words, first, the angle of incidence $\theta_1$ of the coherent light Lc in relation to the reflective sub-wavelength diffraction grating 3, the thickness of the light guide panel main body 2, and the dimension in the width direction of the reflective sub-wavelength diffraction grating 3 are decided. Then, based on these values, the number of occurrences of diffraction in the reflective sub-wavelength diffraction grating 3, or in other words, the total number of occurrences of the diffraction phenomenon, described above, is calculated (Step 1).

Next, based on the total number of occurrences of the diffraction phenomenon calculated at Step 1 and the intensity of the coherent light Lc incident on the first surface S1, a constant intensity of the minus first-order light $L(-1)_i$ to be achieved per single occurrence of diffraction in the reflective sub-wavelength diffraction grating 3 is calculated (Step 2). For example, when the intensity of the coherent light Lc is 100 (may be a relative value in relation to the constant intensity) and the total number of occurrences of the diffraction phenomenon is 21, the constant intensity is $100/21 \approx 4.76$.

Next, the diffraction efficiency of the minus first-order light $L(-1)_i$ per occurrence of diffraction allowing the constant intensity calculated at Step 2 to be achieved is calculated based on the above-described intensity of the coherent light Lc incident on the first surface S1, the constant intensity calculated at Step 2, and a total reduction amount of light intensity caused by diffraction up to the preceding occurrence (Step 3). Here, when presumed that light absorption within the reflective sub-wavelength diffraction grating 3 and the light guide panel main body 2 is extremely low, the total reduction amount of light intensity caused by diffraction up to the preceding occurrence can be determined by multiplying the number of times the minus first-order light has been generated by diffraction up to the preceding occurrence by the above-described constant intensity of the minus first-order light. For example, when the intensity of the coherent light Lc incident on the first surface S1 is 100 and the constant intensity is 4.76, as described above, the diffraction efficiency of the minus first-order light $L(-1)_1$ at the first occurrence of diffraction can be calculated as $4.76/100 = 0.0476$ because there is no preceding occurrence of diffraction. On the other hand, the diffraction efficiency of the minus first-order light $L(-1)_2$ at the second occurrence of diffraction is calculated taking into consideration the reduction amount of light intensity resulting from the first occurrence of diffraction because there is one preceding occurrence of diffraction. Specifically, the diffraction efficiency can be calculated as $4.76/(100-4.76) \approx 0.049979$. In addition, the diffraction efficiency of the minus first-order light $L(-1)_3$ at the third occurrence of diffraction is calculated taking into consideration the total reduction amount of light intensity resulting from two occurrences of diffraction because there are two preceding occurrences of diffraction. Specifically, the diffraction efficiency can be calculated as $4.76/(100-2\cdot4.76) \approx 0.052608$. In a similar manner, the diffraction efficiency of the minus first-order light $L(-1)_{21}$ in the twenty-first occurrence of diffraction (final occurrence) can be calculated as $4.76/(100-20\cdot4.76) \approx 0.991667$, taking into consideration the total reduction amount in light intensity resulting from twenty occurrences of diffraction because there are twenty preceding occurrences of diffraction. In this instance, because most (about 99.96) of the intensity of the intensity 100 of the coherent light Lc can be converted to the minus first-order light, the light use efficiency is a very high value of 99.96%.

Next, the height of each projecting section 22 corresponding to the diffraction efficiency of the minus first-order light per occurrence of diffraction calculated at Step 3 is back-calculated based on simulation results of the diffraction efficiency of the minus first-order light in which the height of the projecting section 22 serves as a variable, obtained from simulation using the above-described vector diffraction theory (Step 4).

In the light guide panel 1 according to the second embodiment as described above, the intensity of the minus first-order light $L(-1)_i$ emitted from each position of emission on the second surface S2 can be made uniform. Therefore, uniformity of luminance of the surface light source can be improved. In addition, because the height of each projecting section 22 that enables the intensity of the minus first-order light to be made uniform can be easily determined, uniformity of luminance of the surface light source can be improved with certainty.

The height of each projecting sections 22 is preferably set such that the intensity of the last new zero-order light generated by the final incidence of zero-order light onto the reflective sub-wavelength diffraction grating 3 is a predetermined value or less. For example, the height may be set such that, when the intensity of the coherent light Lc incident on the first surface S1 is 100, the intensity of the last new zero-order light is 0.1 or less. When the intensity of about 99.96, described above, is converted to the minus first-order light, the intensity of the last new zero-order light can be suppressed to 0.04.

(Light Guide Panel According to Third Embodiment)

Next, a light guide panel according to a third embodiment will be described with reference to FIG. 4, mainly focusing on differences from that according to the first embodiment. For convenience, sections of which the basic configuration is the same or similar to that according to the first embodiment are described using the same reference numbers.

Figure 4:
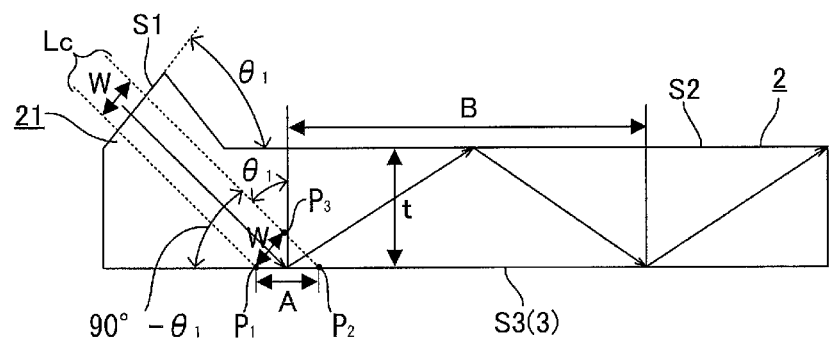
FIG. 4 shows an explanatory diagram for describing a light guide panel according to a third embodiment of the present invention.

As shown in FIG. 4, according to the third embodiment, in a manner similar to that according to the first embodiment, the first surface S1 is formed into a slope (prism 21 slope) having a slope angle $\theta_1[°]$ in relation to the third surface S3 such that the coherent light Lc (light beam) is perpendicularly incident.

In addition, according to the third embodiment, a following conditional expression (4) is satisfied:

$$t \leq W/(2 \cdot \sin \theta_1) \quad (4)$$

where t in expression (4) represents the thickness [mm] of the light guide panel main body 2, as shown in FIG. 4. W in expression (4) represents the light beam width [mm] in the direction perpendicular to the depth direction of the coherent light Lc perpendicularly incident on the first surface 1. The outer peripheral shape of the light beam of the coherent light Lc incident on the first surface S1 may be defined by a frame connecting from the maximum intensity (such as the center) to a position reduced to a predetermined value (such as $1/e^2$) (about 13.5%) in an intensity distribution on a cross-section perpendicular to the traveling direction of the coherent light Lc. The dimension in the direction perpendicular to the depth direction of the frame may be considered the light beam width W.

Expression (4) can be derived in the following manner.

In other words, first, the coherent light Lc incident on the first surface S1 with the light beam width W enters the reflective sub-wavelength diffraction grating 3. At this time, the width of the coherent light Lc in the direction perpendicular to the depth direction on the reflective sub-wavelength diffraction grating 3 (in other words, the third surface S3) is A. Next, when a right triangle of which the vertices are three points $P_1$, $P_2$, and $P_3$ is defined in FIG. 4, the right triangle satisfies the following equation including W, A, and $\theta_1$:

$$W/A = \sin(90° - \theta_1) \qquad (18)$$

When expression (18) is transformed using an addition theorem for trigonometric function, the following equation is obtained:

$$A = W/\cos\theta_1 \qquad (19)$$

Expression (19) is also established for the zero-order light. In other words, when the zero-order light enters the reflective sub-wavelength diffraction grating 3 as well, the width of the zero-order light in the direction perpendicular to the depth direction on the reflective sub-wavelength diffraction grating 3 is $A = W/\cos\theta_1$.

On the other hand, a spatial interval [mm] from a k-th occurrence of diffraction to a k+1-th occurrence of diffraction is a distance in the width direction (horizontal distance) over which the k-th zero-order light $L(0)_k$ advances from the position of generation (position of occurrence of the k-th occurrence of diffraction) to the position of incidence onto the reflective sub-wavelength diffraction grating 3 (position of occurrence of the k+1-th occurrence of diffraction). When the horizontal distance is B, B satisfies the following equation based on FIG. 4:

$$B = 2t \cdot \tan\theta_1 \qquad (20)$$

Here, an area captured by A on the reflective sub-wavelength diffraction grating 3 can be considered to be an area over which the minus first-order light is evenly generated (without gaps) as a result of the incident light beam onto the area being diffracted. If a plurality of areas captured by A can be disposed such as to be connected in the width direction without gaps or such as to overlap to an extent in the width direction, the minus first-order light can be evenly generated in the width direction on the reflective sub-wavelength diffraction grating 3. This means that, if it is taken into consideration that the minus first-order light from each diffraction position within the areas captured by A is parallel with each other, reflexively, the minus first-order light can be evenly emitted in the width direction.

Therefore, the reflective sub-wavelength diffraction grating 3 should be covered by the areas captured by A. To do so, it is required that no space in the width direction is present between A and A that are adjacent in the width direction. This condition can be expressed by the following expression:

$$A \geq B \qquad (21)$$

When expression (19) and expression (20) are substituted for expression (21), the following expression can be obtained:

$$t \leq W/(2 \cdot \sin\theta_1) \qquad (4)$$

Expression (4) can be derived in this way.

In the light guide panel 1 according to the third embodiment, as a result of expression (4) being satisfied, the incidence of light Lc and light L(0) onto the reflective sub-wavelength diffraction grating 3 and the accompanying generation of the minus first-order light $l(-1)$ can be evenly performed in the width direction by a simple structure. In accompaniment, emission of the minus first-order light at the second surface S2 can be evenly performed in the width direction. Therefore, uniformity of luminance of the surface light source can be further improved.

(Light Guide Panel According to Fourth Embodiment)

Next, a light guide panel according to a fourth embodiment will be described with reference to FIG. 5 and FIG. 6, mainly focusing on differences from that according to the first embodiment. For convenience, sections of which the basic configuration is the same or similar to that according to the first embodiment are described using the same reference numbers.

Figure 5:
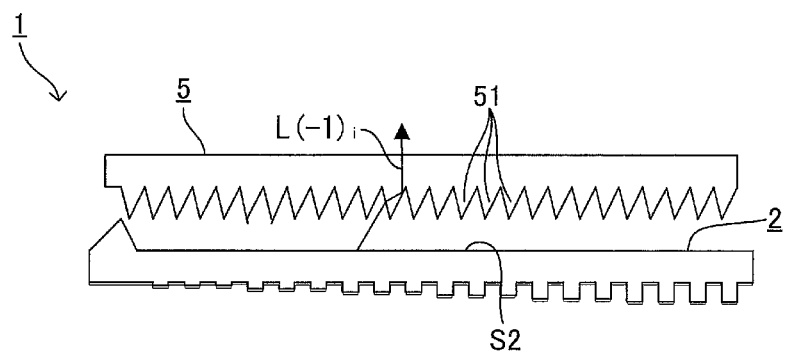
FIG. 5 shows a configuration diagram of a light guide panel according to a fourth embodiment of the present invention.

As shown in FIG. 5, according to the fourth embodiment, a prism sheet 5 composed of a light-transmissive material is disposed in a position facing the second surface S2 of the light guide panel main body 2 with an air layer therebetween. The minus first-order light $L(-1)_i$ of each occurrence of diffraction emitted from the second surface S2 enters the prism sheet 5.

The prism sheet 5 refracts the minus first-order light $L(-1)_i$ that has entered, thereby correcting the traveling direction towards the direction perpendicular to the second surface S2. In addition to refraction, total reflection may be used for correction.

As a result of a configuration such as this, a surface light source in which light is emitted directly above the light guide panel main body 2 and that is suitable for purposes such as a backlight of a liquid crystal display device can be actualized as a result of the traveling direction of the minus first-order light being corrected by the prism sheet 5.

SPECIFIC EXAMPLES

Figure 6:
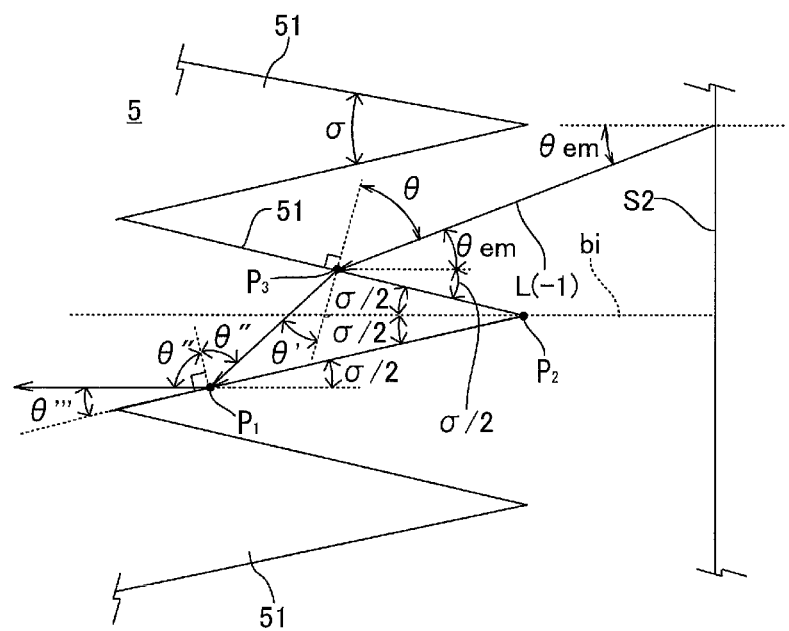
FIG. 6 shows an explanatory diagram for describing a specific example according to the fourth embodiment.

As a specific example according to the fourth embodiment, a configuration such as that shown in FIG. 6 can be given. The prism sheet 5 shown in FIG. 6 has a plurality of prisms 51 having an isosceles triangle shape that sharpens towards the second surface S2 side in an arbitrary cross-section perpendicular to the depth direction. Each prism 51 is disposed such that a bisecting line bi that bisects the vertex in a cross-section is perpendicular to the second surface S2.

In addition, the configuration of the specific example satisfies the following condition expressed by expression (5):

$$\cos\{\sigma/2 + \sin^{-1}(n \cdot \sin\theta_1 - \lambda/\Lambda)\} = N \cdot \cos(3\sigma/2) \qquad (5)$$

where, $\sigma$ in expression (5) is the vertex angle [°] of the prism 51 of the prism sheet 5. N in expression (5) is the refractive index of the prism 51 corresponding to $\lambda$.

The expression (5) can be derived in the following manner.

In other words, first, as shown in FIG. 6, focus is placed on a single ray of minus first-order light $L(-1)$ emitted from the second surface S2 at an angle of emission $\theta$em and a single prism 51 onto which the minus first-order light is incident.

At this time, when the angle of incidence at which the minus first-order light $L(-1)$ enters the slope of the prism 51 is $\theta$ and the refraction angle is $\theta'$, the following equation is established based on Snell's law:

$$\sin\theta = N \cdot \sin\theta' \qquad (22)$$

Here, as is clear from FIG. 6, $\theta$ in expression (22) satisfies a relationship between $\theta$em and $\sigma$ expressed by the following equation:

$$\theta = 90° - (\theta em + \sigma/2) \qquad (23)$$

Next, as shown in FIG. 6, when the angle of incidence at which the minus first-order light $L(-1)$ after entering the prism 51 is internally incident on the slope on the side opposite to the incidence side of the prism 51 (the angle of incidence being greater than the critical angle) is $\theta''$, the sum $\{(90° - \theta'') + \sigma + (90° + \theta)\}$ of the inner angles of a triangle of which the vertices are the three points $P_1$, $P_2$, and $P_3$ in FIG. 6 is 180°. Therefore, a following equation is established among $\theta''$, $\theta'$, and $\sigma$.

$$\theta'' = \theta' + \sigma \qquad (24)$$

Next, as shown in FIG. 6, the minus first-order light L(−1) internally incident on the prism 51 at the angle of incidence θ″ is totally reflected at a reflection angle θ″. The angle formed by the minus first-order light l(−1) after total reflection and the slope on the total reflection side of the prism 51 is θ‴.

Here, to optimize correction of the traveling direction of the minus first-order light by the prism sheet 5, the traveling direction of the minus first-order light L(−1) after total reflection by the prism 51 is required to be parallel in the normal surface direction of the second surface S2. This is equivalent to the following equation:

$$\theta''' = \sigma/2 \qquad (25)$$

Next, as is clear from FIG. 6, θ‴ satisfies the following equation with θ″:

$$\theta''' = 90° - \theta'' \qquad (26)$$

Next, the following equation can be obtained by substituting expression (26) in expression (25) and deleting θ‴:

$$\theta'' = 90° - \sigma/2 \qquad (27)$$

Next, the following equation can be obtained by substituting expression (27) in expression (24) and deleting θ″:

$$\theta' = 90° - 3\sigma/2 \qquad (28)$$

Next, the following equation can be obtained by substituting expression (28) in expression (22) and deleting θ′:

$$\sin\theta = N \cdot \sin\{90° - (3\sigma/2)\} \qquad (29)$$

Next, the following equation can be obtained by substituting expression (29) in expression (23) and deleting θ:

$$\sin\{90° - (\theta em + \sigma/2)\} = N \cdot \sin\{90° - (3\sigma/2)\} \qquad (30)$$

Next, the following equation can be obtained by applying the theorem for trigonometric function to both sides of expression (30):

$$\cos(\theta em + \sigma/2) = N \cdot \cos(3\sigma/2) \qquad (31)$$

Next, θem in expression (31) satisfies a relationship expressed by the following equation based on Snell's law with the angle of incidence θ₂ of the minus first-order light L(−1) onto the second surface S2:

$$\sin\theta em = n \cdot \sin\theta_2 \qquad (32)$$

Next, the following equation can be obtained by expression (32) and above-described expression (7) (diffraction grating equation for the minus first-order light):

$$\theta em = \sin^{-1}(n \cdot \sin\theta_1 - \lambda/\Lambda) \qquad (33)$$

Finally, the following equation can be obtained by substituting equation (33) in expression (31) and deleting θem:

$$\cos\{\sigma/2 + \sin^{-1}(n \cdot \sin\theta_1 - \lambda/\Lambda)\} = N \cdot \cos(3\sigma/2) \qquad (5)$$

Expression (5) can be derived in this way.

As a result of a configuration such as this, optimal correction of the traveling direction of the minus first-order light by the prism sheet 5 can be easily performed by the conditional expression (5) being satisfied.

(Optical System According to Embodiment)

Next, an optical system according to an embodiment of the present invention will be described with reference to FIG. 7A and FIG. 7B.

Figure 7A:
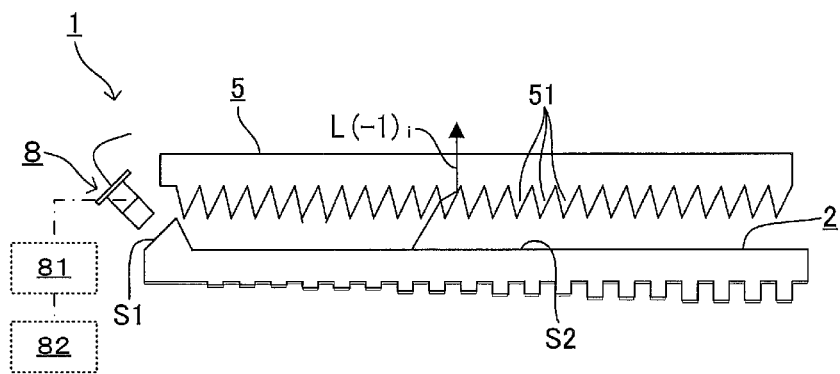
FIG. 7A and FIG. 7B show configuration diagrams of an optical system according to an embodiment of the present invention.
Figure 7B:
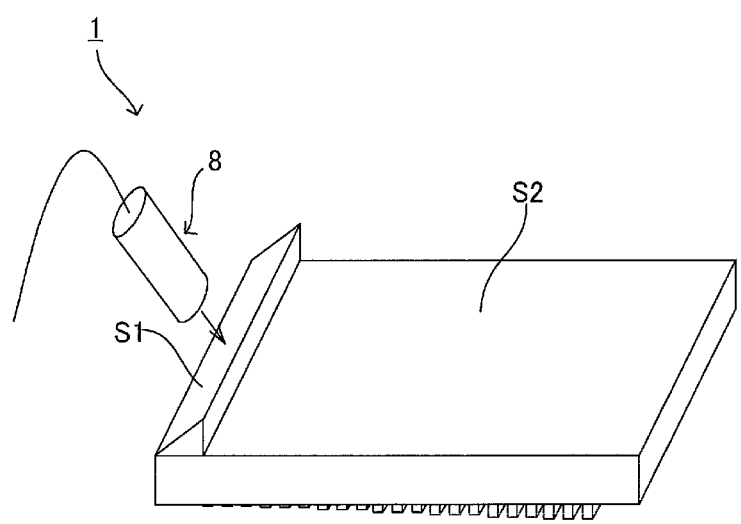

As shown in FIG. 7A, an optical system 7 according to the present embodiment is configured such that a light emitting device 8 that emits the coherent light Lc vertically towards the first surface S1 of the light guide panel 1 is disposed in a position facing the first surface S1 shown in FIG. 5. For convenience, the prism sheet 5 is not shown in the perspective view in FIG. 7B. However, the configuration shown in FIG. 7B is the same as that of the optical system in FIG. 7A.

However, if the light guide panel 1 meets the conditional expressions (1) to (3), the configuration is not limited to that shown in FIG. 5.

In addition, the light emitting device 8 may include a light source 81 that emits the coherent light Lc, and an optical element 82 that shapes the coherent light Lc emitted from the light source 81 into the coherent light Lc having a rectangular shape that is elongated in the depth direction. As an optical element 82 such as this, a laser line generator (such as Lasiris SNF Laser manufactured by Coherent, Inc.) that shapes the light beam shape of laser light serving as the coherent light Lc or the like may be used.

As a result of a configuration such as this, uniformity of luminance of the surface light source can be improved with certainty.

First Example

In a first example, the light guide panel main body 2 is formed using Zeonex-480R (manufactured by Zeon Corporation) as the cyclo-olefin polymer resin. The refractive index n of the material is 1.5224 in relation to λ650 nm. The reflective film 32 is formed by the surface of the fine periodic structure 31 being coated with aluminum with a film thickness of 200 nm. The period Λ of the reflective sub-wavelength diffraction grating 3 is 400 nm.

The coherent light Lc having a wavelength λ=650 nm is incident on the first surface S1 of the light guide panel 1, such as that described above, perpendicularly to the first surface S1 and at an angle of incidence $\theta_1$ of 50° in relation to the reflective sub-wavelength diffraction grating 3. A configuration such as this satisfies expressions (1) to (3).

Figure 8:
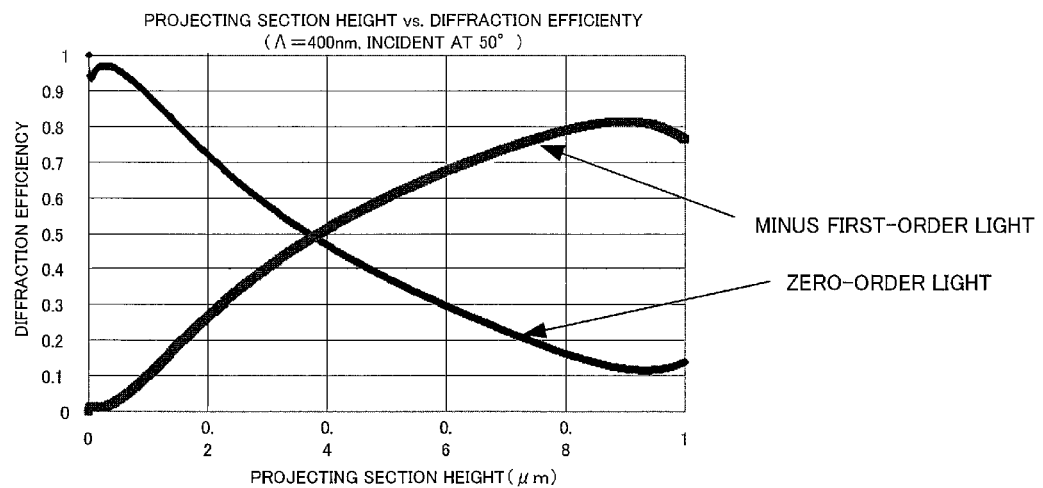
FIG. 8 shows a graph showing diffraction efficiency in a first example of the present invention.

In this instance, light obtained by diffraction at the reflective sub-wavelength diffraction grating 3 is only the zero-order light and the minus first-order light, as shown in the diffraction efficiency graph in FIG. 8, when calculated using the RCWA method. The horizontal axis in FIG. 8 indicates the height of the projecting section 22 and the vertical axis indicates the diffraction efficiency.

At this time, the diffraction angle of the minus first-order light is −17.5° based on expression (7). Because the diffraction angle is smaller than the critical angle, the minus first-order light is appropriately emitted from the second surface S2 and can be used for the surface light source.

On the other hand, the zero-order light is reflected at the reflective sub-wavelength diffraction grating 3 (reflective film 32) at a reflection angle of −50° equivalent to the angle of incidence of 50° of the coherent light Lc in relation to the reflective sub-wavelength diffraction grating 3, and then internally incident on the second surface S2 at an angle of incidence of 50°. Because the angle of incidence of 50° is greater than the critical angle, the zero-order light is totally reflected at the second surface S2 and can be transmitted to the next position of diffraction on the reflective sub-wavelength diffraction grating 3 to generate the next minus first-order light.

Second Example

Next, in a second example, only the condition regarding the period of the reflective sub-wavelength diffraction grating 3 has been changed from that in the first example such that Λ=450 nm.

Figure 9:
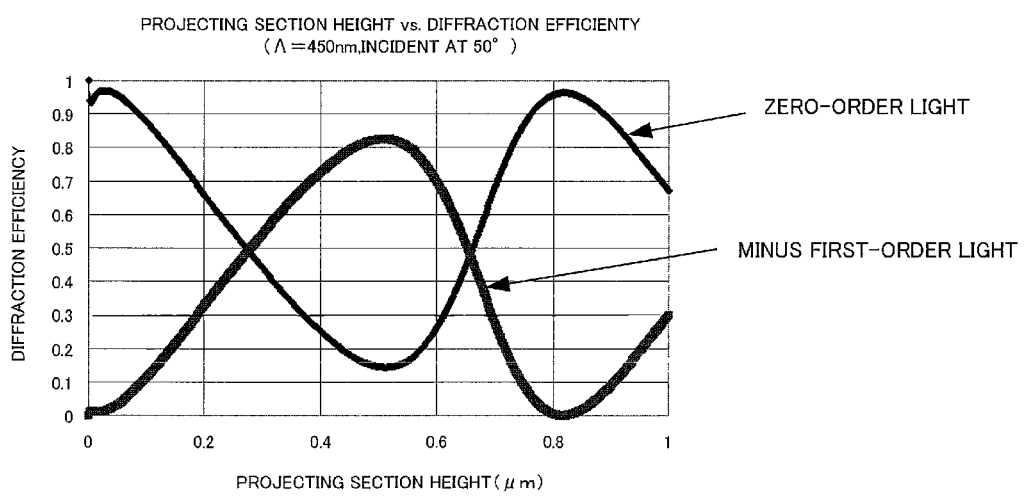
FIG. 9 shows a graph showing diffraction efficiency in a second example of the present invention.

In the second example as well, expressions (1) to (3) are satisfied. The light obtained by diffraction at the reflective sub-wavelength diffraction grating 3 is only the zero-order light and the minus first-order light as shown in the diffraction efficiency graph in FIG. 9.

At this time, the diffraction angle of the minus first-order light is −10.5° based on expression (7). An angle at which the minus first-order light can be incident on the second surface S2 at an angle smaller than the critical angle is achieved. On the other hand, the reflection angle of the zero-order light is −50° similar to the first example.

In the second example as well, in a manner similar to the first example, the minus first-order light can be appropriately emitted at the second surface S2, and the zero order light can be appropriately transmitted through the light guide panel main body 2 to generate the next minus first-order light.

Third Example

Next, in a third example, only the material of the reflective film 32 has been changed from that in the first example, such that the reflective film 32 is composed of silver.

In the third example as well, expressions (1) to (3) are satisfied. The light obtained by diffraction at the reflective sub-wavelength diffraction grating 3 is only the zero-order light and the minus first-order light as shown in the diffraction efficiency graph in FIG. 10.

At this time, the diffraction angle of the minus first-order light and the reflection angle of the zero-order light are the same as those in the first example.

Figure 10:
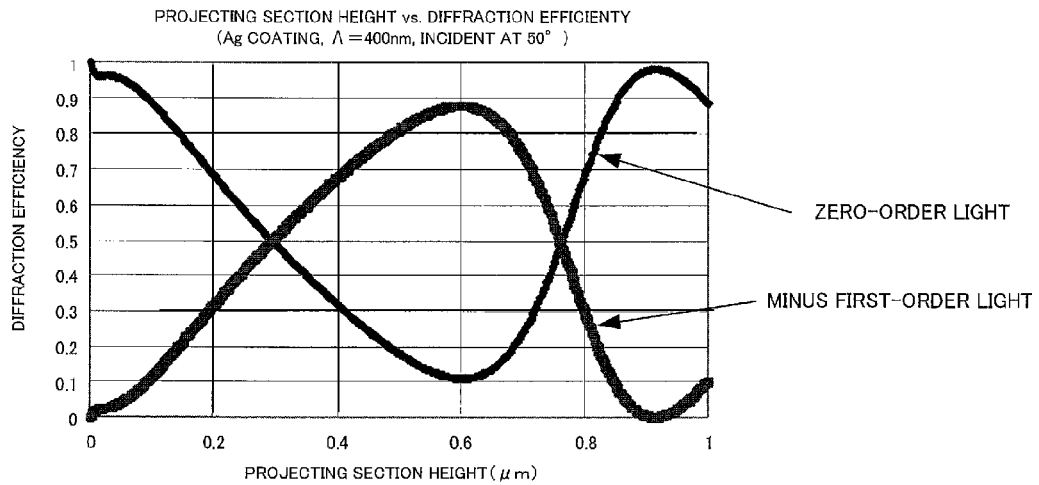
FIG. 10 shows a graph showing diffraction efficiency in a third example of the present invention.

As shown in FIG. 10, the configuration in the third example can achieve diffraction efficiency of the minus first-order light that is a maximum of 87.8%. It is clear that the configuration is more suitable for improving luminance than that of the first example. This is because silver having better reflectance than aluminum is used as the reflective film 32.

Fourth Example

Next, in a fourth example, in addition to expressions (1) to (3) being satisfied, the optimal height for each projecting section 22 of the reflective sub-wavelength diffraction grating 3 has been set to make the intensity of the minus first-order light uniform.

However, in the fourth example, the size of the light guide panel main body 2 is set to 50 mm(width)×50 mm(depth) and a thickness of 1 mm as a premise. In addition, the coherent light Lc has a wavelength $\lambda$=650 nm and an angle of incidence $\theta_1$=50° in relation to the reflective sub-wavelength diffraction grating 3.

Based on such premise, first, when the total number of occurrences of the diffraction phenomenon in the reflective sub-wavelength diffraction grating 3 is calculated at Step 1, the total number of occurrences is 50/2 tan 50°≈21.

Next, when presumed that the incident light quantity (relative value) serving as the intensity of the coherent light Lc is 100 and the constant light quantity (relative value) of the minus first-order light is calculated at Step 2 based on the calculation result at Step 1, the constant light quantity is 100/21≈4.76.

Next, when the diffraction efficiency of the minus first-order light per occurrence of diffraction that can generate minus first-order light having the intensity (here, the relative value of light quantity) indicated by the calculation result at Step 2 is calculated at Step 3 based on the light quantity 100 of the light incident on the first surface S1, the constant light quantity 4.76, and the total reduction amount of light quantity caused by diffraction up to the preceding occurrence, the diffraction efficiency is as shown in the middle column of Table 1, below.

TABLE 1

| NUMBER OF OCCURRENCES OF DIFFRACTION | DIFFRACTION EFFICIENCY | PROJECTING SECTION HEIGHT (nm) |
|---|---|---|
| 1 | 0.0476 | 58 |
| 2 | 0.049979 | 60 |
| 3 | 0.052608 | 62 |
| 4 | 0.05553 | 65 |
| 5 | 0.058794 | 67 |
| 6 | 0.062467 | 70 |
| 7 | 0.066629 | 73 |
| 8 | 0.071386 | 76 |
| 9 | 0.076873 | 80 |
| 10 | 0.083275 | 84 |
| 11 | 0.09084 | 88 |
| 12 | 0.099916 | 94 |
| 13 | 0.111007 | 100 |
| 14 | 0.124869 | 107 |
| 15 | 0.142686 | 117 |
| 16 | 0.166434 | 129 |
| 17 | 0.199664 | 145 |
| 18 | 0.249476 | 169 |
| 19 | 0.332402 | 209 |
| 20 | 0.497908 | 295 |
| 21 | 0.991667 | 600 |

Next, the height of each projecting section 22 corresponding to the diffraction efficiency of the minus first-order light per occurrence of diffraction calculated at Step 3 is back-calculated based on the simulation results of the diffraction efficiency of the minus first-order light in which the height of the projecting section 22 is the variable. The back-calculation is performed using FIG. 10 as the diffraction efficiency graph. The calculation results for height in this instance are as shown in the right-hand column of Table 1.

In the fourth example, the intensity (relative value of light quantity) of the minus first-order light per occurrence of diffraction can be unified to 4.76. Therefore, uniformity of luminance of the surface light source can be improved with certainty. In addition, because the intensity of the last new zero-order light generated by the twenty-first occurrence of diffraction can be made almost zero, improvement in light use efficiency can be actualized.

First Comparison Example

On the other hand, in a first comparison example, only the condition regarding the period of the reflective sub-wavelength diffraction grating 3 has been changed from that in the first example, such that $\Lambda$=600 nm.

In the first comparison example, expression (2) is not satisfied because the value of $\Lambda$ is too high. Therefore, the light obtained by diffraction in the reflective sub-wavelength diffraction grating 3 includes minus second-order light in addition to the zero-order light and the minus first-order light. For example, when the height of the projecting section 22 is 200 nm, the diffraction efficiency of the minus first-order light is 28.9% and the diffraction efficiency of the minus second-order light is 22.4%.

In the configuration of the first comparison example such as this, the minus second-order light becomes stray light, and favorable optical characteristics cannot be achieved.

Second Comparison Example

Next, in a second comparison example, only the condition regarding the angle of incidence $\theta_1$ of the coherent light Lc in relation to the reflective sub-wavelength diffraction grating 3 has been changed from that in the second example, such that the angle of incidence is 80°.

Figure 11:
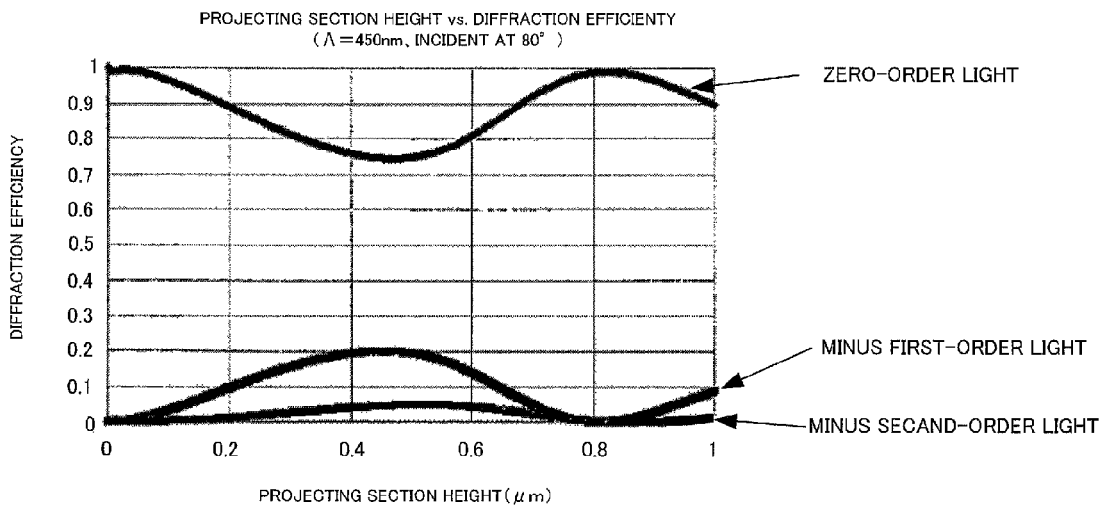
FIG. 11 shows a graph showing diffraction efficiency in a second comparison example of the present invention.

In the second comparison example, expression (2) is not satisfied because the value of $\theta_1$ is too high. Therefore, the light obtained by diffraction in the reflective sub-wavelength diffraction grating 3 is the zero-order light, the minus first-order light, and the minus second-order light, as shown in the diffraction efficiency graph in FIG. 11.

In the configuration of the second comparison example as well, optical characteristics deteriorate due to the presence of stray light (minus second-order light).

Third Comparison Example

Next, in a third comparison example, only the condition regarding the period of the reflective sub-wavelength diffraction grating 3 has been changed from that in the first example, such that $\Lambda=290$ nm.

In the third comparison example, expression (2) is not satisfied because the value of $\Lambda$ is too high. Therefore, the diffraction angle of the minus first-order light becomes 44.9° based on expression (7), and the minus first-order light is incident on the second surface S2 at an angle greater than the critical angle.

In the configuration of the third comparison example, the minus first-order light is totally reflected at the second surface S2 without being emitted. Therefore, the surface light source cannot be actualized.

The present invention is not limited to the above-described embodiments. Various modifications can be made without compromising the characteristics of the present invention.

The invention claimed is:

1. A light guide panel comprising:
a plate-shaped, light-transmissive light guide panel main body having predetermined width, depth, and thickness, and having a first surface on which coherent light is incident, a second surface disposed adjacent to the first surface in a width direction and perpendicular to a thickness direction in which outgoing light based on the coherent light incident on the first surface is extracted, and a third surface disposed parallel with the second surface in a position facing the second surface in the thickness direction, wherein
a reflective sub-wavelength diffraction grating is provided on the third surface, the reflective sub-wavelength diffraction grating being composed of a fine periodic structure in which a plurality of projecting sections, formed integrally with the light guide panel main body and elongated in the depth direction, are disposed along the width direction in an array at an interval smaller than the wavelength of the coherent light, and a reflective film covering the fine periodic structure, and
only zero-order light and minus first-order light are generated by incidence of the coherent light onto the reflective sub-wavelength diffraction grating, the generated zero-order light entering the second surface at an angle of incidence greater than a critical angle, being totally reflected, and then incident on the reflective sub-wavelength diffraction grating, while on the other hand, the generated minus first-order light enters the second surface at an angle of incidence smaller than the critical angle and is emitted from the second surface, and subsequently, generation of only new zero-order light and minus first-order light as a result of incidence of the zero-order light onto the reflective sub-wavelength diffraction grating, incidence of the generated new zero-order light onto the reflective sub-wavelength diffraction grating after total reflection by the second surface, and emission of the generated new minus first-order light from the second surface are repeated a plurality of times, as a result of each conditional expression expressed by the following expressions (1) to (3) being satisfied:

$$\sin^{-1}(1/n) < \theta_1 \qquad (1)$$

$$\lambda/\{n(\sin\theta_1++1)\} \leq \Lambda < \min[2\lambda/\{n(\sin\theta_1+1)\}, \lambda/\{n(-\sin\theta_1+1)\}] \qquad (2)$$

$$\sin^{-1}\{\sin\theta_1 - \lambda/(n\cdot\Lambda)\} < \sin^{-1}(1/n) \qquad (3)$$

where,
$\lambda$: wavelength of the light
$n$: refractive index of the light guide panel main body
$\Lambda$: period of the reflective sub-wavelength diffraction grating
$\theta_1$: angle of incidence of the light in relation to the reflective sub-wavelength diffraction grating.

2. The light guide panel according to claim 1, wherein:
the reflective sub-wavelength diffraction grating is formed such that the height of the projecting sections and diffraction efficiency of the minus first-order light corresponding to the height increase towards a downstream side of a transmission direction of the zero-order light in the width direction such that intensity of the minus first-order light emitted from the second surface is uniform regardless of position of emission.

3. The light guide panel according to claim 2, wherein:
the height of the projecting sections is set such that the intensity of the last new zero-order light generated by the last incidence of zero-order light onto the reflective sub-wavelength diffraction grating is a predetermined value or less.

4. The light guide panel according to claim 2, wherein:
the height of the projecting sections is determined by calculating the number of occurrences of diffraction based on the coherent light in the reflective sub-wavelength diffraction grating, based on $\theta_1$, the thickness of the light guide panel main body, and the dimension in the width direction of the reflective sub-wavelength diffraction grating,
calculating a constant intensity of the minus first-order light to be achieved per occurrence of diffraction in the reflective sub-wavelength diffraction grating, based on the calculated number of occurrences and the intensity of the coherent light,
calculating the diffraction efficiency of the minus first-order light per occurrence of diffraction allowing the calculated constant intensity to be achieved, based on the intensity of the coherent light, the constant intensity, and total reduction amount of light intensity caused by diffraction up to the preceding occurrence, and
back-calculating the height of the projecting sections corresponding to the calculated diffraction efficiency of the minus first-order light per occurrence of diffraction, based on simulation results of diffraction efficiency of the minus first-order light in which the height of the projecting section is a variable.

5. The light guide panel according to claim 1, wherein:
the first surface is formed into a slope having a slope angle $\theta_1$ in relation to the third surface such that the coherent light is perpendicularly incident, and
a conditional expression expressed by the following expression (4) is satisfied:

$$t \leq W/(2\cdot\sin\theta_1) \qquad (4)$$

where,
$t$: thickness of the light guide panel main body
$W$: light beam width in the direction perpendicular to the depth direction of the coherent light perpendicularly incident on first surface.

6. The light guide panel according to claim 1, wherein:
the first surface is composed of a slope of a prism that is continuous with an end section on an upstream side of the transmission direction of the zero-order light in the width direction of the second surface.

7. The light guide panel according to claim 1, wherein:
the first surface is formed into a rectangular shape that is elongated along the depth direction, and
the coherent light has a rectangular shape that is elongated along the first surface on the first surface.

8. The light guide panel according to claim 1, comprising:
a prism sheet disposed facing the second surface, the prism sheet correcting a traveling direction of the minus first-order light towards a direction perpendicular to the second surface by refracting the minus first-order light emitted from the second surface.

9. The light guide panel according to claim 8, wherein:
the prism sheet has a plurality of prisms having an isosceles triangle shape that sharpens towards the second surface side in an arbitrary cross-section perpendicular to the depth direction, each prism being disposed such that a bisecting line bisecting the vertex in a cross-section is perpendicular to the second surface, and
a conditional expression expressed by the following expression (5) is satisfied:

$$\cos\{\sigma/2 + \sin^{-1}(n \cdot \sin\theta_1 - \lambda/\Lambda)\} = N \cdot \cos(3\sigma/2) \quad (5)$$

where,
σ: vertex angle of the prism of the prism sheet
N: refractive index of the prism of the prism sheet.

10. An optical system comprising:
the light guide panel according to claim 8, and
a light emitting device that emits the coherent light towards the first surface of the light guide panel.

11. The optical system according to claim 10, wherein:
the first surface is formed into the elongated rectangular shape that is elongated along the depth direction, and
the light emitting device includes
a light source that emits the coherent light, and
an optical element that shapes the coherent light emitted from the light source into light having the elongated rectangular shape that is elongated along the first surface on the first surface.

12. An optical system comprising:
the light guide panel according to claim 9, and
a light emitting device that emits the coherent light towards the first surface of the light guide panel.

13. The optical system according to claim 12, wherein:
the first surface is formed into the elongated rectangular shape that is elongated along the depth direction, and
the light emitting device includes
a light source that emits the coherent light, and
an optical element that shapes the coherent light emitted from the light source into light having the elongated rectangular shape that is elongated along the first surface on the first surface.

* * * * *